Oct. 6, 1959  KYOHEI YOKOSE ET AL  2,907,815
INSULATED CONDUCTOR FOR COMMUNICATION CABLES
AND THE MANUFACTURING METHOD OF THE SAME
Filed June 12, 1956
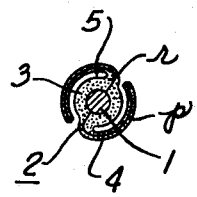
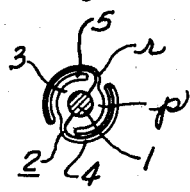
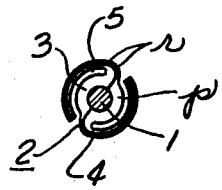
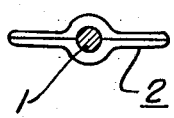
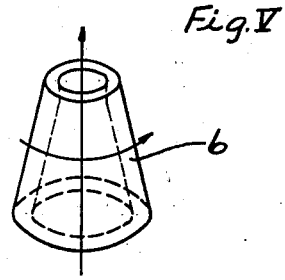
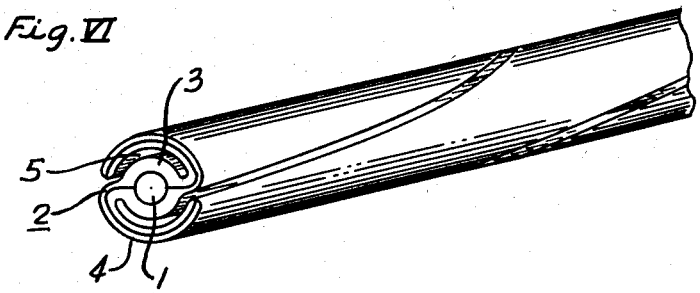
INVENTORS
KYOHEI YOSOKE &
MASAO SUGI
BY
*William H. Carothers*
THEIR ATTORNEY

United States Patent Office 2,907,815
Patented Oct. 6, 1959

2,907,815

INSULATED CONDUCTOR FOR COMMUNICATION CABLES AND THE MANUFACTURING METHOD OF THE SAME

Kyohei Yokose, Mori, Motoyama-cho, Higashinada-ku, Kobe, and Masao Sugi, Toyonaka-shi, Osaka-fu, Japan, assignors to Sumitomo Electric Industries, Ltd., Konohana-ku, Osaka, Japan, a company of Japan Application June 12, 1956, Serial No. 590,886

Claims priority, application Japan June 15, 1955

1 Claim. (Cl. 174—121)

This invention relates to insulated conductors for communication cables, and more especially to conductors insulated with insulating paper and a substance such as resin or rubber, and also the method of manufacturing the same.

One object of this invention is to obtain insulated conductors for communication cables which has a great mechanical strength, a highly moisture-proof property, and a small effective dielectric constant.

Another object of this invention is to provide a method by which such insulated conductors for communication cables can easily be made.

The insulated conductors for communication cables manufactured heretofore are generally insulated with paper or pulp. However, paper and pulp have a drawback that they are absorbent of moisture.

In recent years, insulation with a substance such as resin, for example polyethylene, is practised in order to eliminate the above-mentioned defects of paper or pulp insulation.

However, this method is not yet satisfactory, because, although polyethylene and other resins are excellent in their moisture-proof property, they have poor mechanical strength and are susceptible to external damage when used as a comparatively thin layer of insulation (for instance, 0.2 mm. or less).

The electrostatic capacity of an insulated conductor for communication cables, must be made as small as possible, and therefore, it is desirable to have much air space within the insulating layer.

This invention eliminates the above defects and satisfies the above requirements.

The insulated conductor of this invention comprises a conductor in the axle and an insulating covering, said covering having ears which are bent and hold air space between the axle and the conductor, and said insulating covering consisting of insulating paper and a substance such as resin or rubber.

The attached drawings show certain embodiments of the invention, in which Figures I–III illustrate certain examples of the insulated conductors of this invention, Figures IV and V are illustrations for explaining the method of manufacturing insulated conductors of this invention, and Figure VI illustrates the twist in the insulation covering the conductor.

The invention is hereunder explained with reference to the attached drawings in which certain examples are given.

INSULATED CONDUCTOR

Example 1

Insulated conductor, of which the insulating covering is made of insulating paper impregnated with a substance such as resin or rubber.

A cross-section of this insulated conductor is shown in Figure I, in which 1 is the conductor, 2 the insulating covering, 3 the axle of the insulating covering 2, 4 the ear of the insulating covering 2, and 5 the air space between the axle 3 and the bent ear 4. The said insulating covering 2 is made of insulating paper $p$ which is impregnated with a resin or rubber substance $r$, such as polyethylene, melamine, vinylidene chloride, rubber latex, etc.

Such an insulated conductor is suitable for use as insulated conductors for communication cables, and has the following advantages:

(a) The insulating covering is of non-solid type, having air space within the layer of insulating covering, and therefore, has a small effective dielectric constant.

(b) As shown in the following table, the insulating covering has an excellent mechanical strength due to the insulating paper thereof. Although the insulated conductor is of non-solid type, it is not susceptible to external damage during the assemblage and other operations after manufacture of the insulated conductors, and therefore, there is no fear of contacts.

|  |  | Polyethylene | Insulating Paper impregnated with Polyethylene |
|---|---|---|---|
| Load at which elongation occurs | | 150 g. | 2,300 g. |
| Shore-A Durometer | Hardness 83 | Concavity produced. | Concavity produced. |
|  | Hardness 100 | ____do____ | No change. |

The sample used; thickness 0.04 mm., width 10 mm., length 100 mm.

(c) The moisture-proof property is given to the insulating conductor by a substance such as resin or rubber contained therein.

(d) As the insulating covering consists of insulating paper and a substance such as resin or rubber, it is, differently from an insulating covering made solely of resin such as polyethylene, free from the softening, deformation and melting on heating at the time of sheathing or cable-jointing and other plumbing work.

(e) Furthermore, such insulated conductor is easy to manufacture, as mentioned below.

INSULATED CONDUCTOR

Example 2

Insulated conductor, of which the insulating covering is made of insulating paper provided with a coating film of a substance such as resin or rubber.

Cross sections of this insulated conductor are shown in Figure II and Figure III. Figure II shows a conductor with a coating film of a substance such as resin or rubber on one side of the insulating paper, and Figure III shows a conductor with such coating film on both sides of the insulating paper. The same numbers as in Figure I are used in these figures to indicate the corresponding parts.

The coating film of a substance such as resin or rubber mentioned above is formed by applying a solution of polyethylene or the like on insulating paper or by pasting a tape of such substance on insulating paper.

Similarly to the insulated conductor of the Example I, this insulated conductor has the following advantages:

(a) The effective dielectric constant is small.
(b) The mechanical strength is great.
(c) A moisture-proof property is imparted.
(d) The deformation by heat hardly occurs.
(e) The manufacture thereof is easy.

In the insulated conductor of this invention explained above, the insulating covering may be twisted as illustrated in Figure 6. Now we shall explain examples of the method of manufacturing such insulated conductors.

EXAMPLE OF THE METHOD OF MANUFACTURING INSULATED CONDUCTOR

Method of manufacturing insulated conductors in which the upper and the lower sides of the conductors are longitudinally covered with insulating tapes which are sealed by heating and pressing on the left and the right of the conductor and are cut, either simultaneously or immediately after sealing, to separate insulated conductors, made of conductors with covering that has ears, and then to bend the ears of this covering.

Figures IV and V illustrate this method. We prepare first insulating tape made of insulating paper and a substance such as resin or rubber. This tape is made, as mentioned above, by impregnating insulating paper with a substance such as resin or rubber, or by applying such substance on insulating paper, or by pasting tape of a substance such as resin or rubber on insulating paper.

Then, an insulating conductor which has covering with ears, a cross section of which is shown in Figure IV, is manufactured by the usual covering method. Namely, two sheets of said insulating tape, consisting of insulating paper and a substance such as resin or rubber, are longitudinally applied on the upper and the lower side of several lines of conductors, which move on in parallel and are sealed together on the left and the right of each of the conductors and are cut in the center to separate each insulated conductor. To provide the novel structure comprising this invention the ears of this insulated covering are bent, an air space being held between the axle and ears. As shown the ears are bent in cylindrical form and the air space is open all along the conductor as illustrated in Figure 6 which allows this air space to be open to the air within the cable. This can be done, for instance, by passing the insulated conductor in the direction shown by the vertical arrow through a heated die 6 which revolves in the direction shown by the horizontal arrow in Figure V. This can also be done by first habituating the ears in the bending direction with a suitable shaping tool and then squeezing them with a heated die, or by performing the above shaping and squeezing at the same time.

The above-mentioned manufacture of insulated conductor, which has covering with ears, by the covering method is not more difficult than the manufacture of such conductor in which the insulating tape is made solely of polyethylene or a similar resin. On the contrary, it is easier in case the side that comes in contact with the roller at the time of covering is not coated with a substance such as resin or rubber, or in case such side is coated with a substance such as resin or rubber which hardens upon heating.

The bending of the ears can also be effected in a very easy way as mentioned above, as the paper itself is ready to get set.

Consequently, a desired insulated conductor can easily be obtained by the above-mentioned method of this invention. We have explained certain examples of the insulated conductors for communication cables of this invention and the method of manufacturing the same. However, this invention should by no means be restricted to the examples cited, and variations thereof can be made without departing from the spirit of the invention.

We claim:

An insulated conductor for grouping with similar insulated conductors in making up communication cables consisting of a conductor, a longitudinally extending heat deformation resistant insulating cover on each side of the conductor in the form of two paper tapes laminated with each other and containing a resin to provide great mechanical strength and highly moisture proof properties, said laminated tape having diametrically positioned ears in the shape of an S, the diametrical portions of each of said ears substantially encircling in the same direction around one half of each side of said conductor and in spaced relation with that portion of the insulating cover directly over said conductor to form an air space on each side of said conductor, said ears having cylindrical shape, with their longitudinal edges stopping short of the opposite ear to provide a continuous opening to each air space, and said insulated covering of each conductor being twisted.

References Cited in the file of this patent

UNITED STATES PATENTS

| | | |
|---|---|---|
| 280,366 | Dunham | July 3, 1883 |
| 1,800,411 | Selvig | Apr. 14, 1931 |
| 1,976,804 | Ringel | Oct. 16, 1934 |
| 2,379,756 | Selvig | July 3, 1945 |
| 2,440,668 | Tarbox | Apr. 27, 1948 |

FOREIGN PATENTS

| | | |
|---|---|---|
| 235,072 | Great Britain | June 11, 1925 |
| 400,781 | Great Britain | Nov. 2, 1933 |
| 487,578 | Great Britain | June 22, 1938 |
| 148,185 | Australia | Sept. 12, 1952 |